United States Patent [19]

Confer et al.

[11] 3,715,220
[45] Feb. 6, 1973

[54] CERAMIC ARTICLE AND METHOD OF MAKING IT

[75] Inventors: James O. Confer, Tioga, Pa.; George D. McTaggart, Horseheads, N.Y.

[73] Assignee: Corning Glass Works, Corning, N.Y.

[22] Filed: March 19, 1969

[21] Appl. No.: 808,654

[52] U.S. Cl. ............... 106/39 DV, 106/52, 106/45, 65/18, 65/33, 264/66, 264/86
[51] Int. Cl. .......... C03c 3/22, C03c 3/04, C03c 3/30
[58] Field of Search....106/39 DV, 52; 264/66; 65/33

[56] References Cited

UNITED STATES PATENTS

| | | | |
|---|---|---|---|
| 3,480,452 | 11/1969 | Fleischner et al. | 106/48 |
| 3,246,972 | 4/1966 | Smith | 106/39 DV |
| 3,600,204 | 8/1971 | Beall et al. | 106/39 DV |
| 3,251,403 | 5/1966 | Smith | 106/39 DV |
| 3,006,775 | 10/1961 | Chen | 106/39 DV |
| 3,157,522 | 11/1968 | Stookey | 106/39 |

OTHER PUBLICATIONS

Hummel, F.A., Thermal Expansion Properties of Some Snythetic Lithia Minerals, JACS, 34, 235–239, in particular FIG. 5 & paragraph V(3).

Primary Examiner—Helen M. McCarthy
Assistant Examiner—M. Bell
Attorney—Clarence R. Patty, Jr. and Richard N. Wardell

[57] ABSTRACT

Characterized by substantially zero coefficient of thermal expansion over a general range of room temperature variations, the article consists essentially of a sintered consolidated particulate mixture of substantially equal portions of first and second materials. First material is composed mainly of $SiO_2$ with critical lesser amounts of $Al_2O_3$ and $Li_2O$ in a mole ratio of 1.5 or less. Second material is composed mainly of $SiO_2$ together with critical lesser amounts of $Al_2O_3$, $TiO_2$ and $Li_2O$ constituting at least 95 wt. percent of the material and with small amounts of required MgO and optional ZnO. Green article formed of the particulate mixture is given three-stage heat treatment at progressively higher temperatures to develop the very low thermal expansion coefficient, sintering and substantial imperviousness to water and air.

6 Claims, No Drawings

CERAMIC ARTICLE AND METHOD OF MAKING IT

BACKGROUND OF THE INVENTION

Many articles of manufacture or components of devices used in precision measurement ideally should have perfect volume stability and zero thermal expansion over a general or ordinary range of room or use environment temperature variations (which, for most practical purposes, can be arbitrarily defined as 5° to 35° C.) in order not to introduce any measurement errors because of fluctuations in ambient temperature. Examples of such articles or components are surface plates, optical tooling, optical benches, mirror support structures and the like. It is also often desirable that such items have substantially zero apparent porosity.

The various shapes and sizes of articles or components noted above are often made more practicably and easily by compacting and sintering a particulate mass of ceramic and/or glass-ceramic materials having the lowest possible thermal expansion and apparent porosity characteristics in the finished sintered state. A number of such materials characterized by quite low thermal expansion coefficients over broad temperature ranges of 0°–300° C. or more have been proposed and/or tried heretofore with, at best, only moderately suitable results over the narrower temperature range (5° to 35° C.) of relevance to the items noted above. For example, among such materials are some of those disclosed in U.S. Pat. No. 3,246,972, which in part can include material disclosed in U.S. Pat. No. 3,157,522. For the most part, the thermal expansion coefficients over the range of 5°–35° C. were either about equal to or greater than $2 \times 10^{-7}/°C$. or about equal to or less than $-2 \times 10^{-7}/°C$., but it was not found practically possible to consistently and reproducibly manufacture, in a reasonable manner, sintered bodies with substantially zero thermal expansion coefficients ($0 \pm 1 \times 10^{-7}/ALC$.) over the range of 5°–35° C.

SUMMARY OF THE INVENTION

We have now discovered a ceramic article, and a method of making it, that is characterized by substantially zero coefficient of thermal expansion ($0 \pm 1 \times 10^{-7}/°C$.) over the temperature range of 5°–35°C and, as a result of the particular method to be described, also by not more than 1 percent apparent porosity that renders it substantially impervious to water and air. This article can be easily, consistently and reproducibly manufactured to form improved surface plates, optical tooling, optical benches, mirror support structures and the like that afford greater precision measurements while being subjected to the usual fluctuations in ambient room or use environment temperatures, particularly in the range of 5°–35° C.

The article according to this invention consists essentially of a sintered consolidated particulate mixture that consists of: (a) 45 to 55 weight percent first particulate material composed of, on an oxide basis by weight, 70 to 74% $SiO_2$, 22 to 24% $Al_2O_3$, 4 to 6% $Li_2O$ and 0 to 2% other oxides, with the mole ratio $Al_2O_3:Li_2O$ being not more than 1.5, and (b) 45 to 55 weight percent second particulate material composed of, on an oxide basis by weight, 68 to 72% $SiO_2$, 17 to 19% $Al_2O_3$, 4 to 6% $TiO_2$, 2 to 4% $Li_2O$, the sum of $SiO_2$, $Al_2O_3$, $TiO_2$ and $Li_2O$ constituting at least 95% of the total second particulate material, 2 to 4% $MgO$, 0 to 2% $ZnO$ and 0 to 2% other oxides. It is also characterized by being predominantly composed of fine-grained inorganic crystals, which crystals are dispersed in a small amount of glassy matrix. The major crystalline phase is a beta-spodumene solid solution containing mainly the three components $LiAlSi_2O_6$ (spodumene), $Al_2O_3$ and $SiO_2$. Minor crystalline phases that occur are mullite, cordierite and rutile.

Each of the particulate materials employed in making the new article can either be in the form of finely crushed glass cullet or frit that will naturally undergo thermal devitrification or crystallization during the controlled firing or heat treatment of the article (to be described later) or be in the already devitrified or crystallized state as a result of being preliminarily given substantially the same or equivalent controlled heat treatment. Preferably, the former form of particulate materials are employed to assure substantially zero apparent porosity in the sintered article. The glass particulate materials are conventionally formed by melting batch materials of the required composition and cooling the melts to a glass, which is then reduced to a finely divided form, e.g., −8+20 Tyler mesh or finer. These particulate materials are then ball-milled to finer mesh sizes as required or desired. For example, in a casting slip, we have found it desirable for the particulate mixture to consist of 100 wt. percent-4 Tyler mask particles of which 0 to 30 wt.% −4+100 Tyler mesh particles and at least 90 wt. percent of the balance being −325 Tyler mesh particles. The coarser particles are preferably employed in thicker articles as a grog fraction.

The desired method of the present invention comprises forming a green article from the particulate mixture by any technique deemed appropriate in a given situation from among the usual art-recognized techniques (e.g. slip casting, ram or isostatic pressing, extrusion, injection molding and the like). Then the green body is subjected to the following sequential firing or heat treatment:

heat from room temperature to 1020°–1080° C.,
hold at 1020°–1080° C. for at least 0.5 hour,
heat from 1020°–1080° C. to 1150°–1210° C.,
hold at 1150°–1210° C. for at least 0.5 hour,
heat from 1150°–1210° C. to 1250°–1270° C.,
hold at 1250°–1270° C. for at least 1 hour, and
thereafter cooling to room temperature.

Ordinary furnace heating and cooling rates have been found suitable, but controlled slower rates can be applied, as is conventional in the art, if required in particular cases to avoid cracking from thermal stresses.

Especially desirable sintered articles of the present invention have been made with coefficients of thermal expansion being $0 \pm 0.2 \times 10^{-7}/°C$. over the range of 5°–35 C. by utilizing about equal parts of the aforesaid first and second particulate materials. The composition of first particulate material, on an oxide basis by weight, was preferably limited within the ranges of 71 to 73% $SiO_2$, 22 to 24% $Al_2O_3$, 4.5 to 5.5% $Li_2O$ and not more than 0.5 percent other oxides, with the mole ratio $Al_2O_3:Li_2O$ being not more than 1.5. Likewise, the composition of the second particulate material, on an oxide basis by weight, was preferably limited within the ranges of 69 to 71% $SiO_2$, 17 to 19% $Al_2O_3$, 4 to 5.5%

$TiO_2$, 2 to 3% $Li_2O$, the sum of $SiO_2$, $Al_2O_3$, $TiO_2$ and $Li_2O$ constituting at least 95% of the total material, 2.3 to 3.3% MgO and 0.5 to 1.5% ZnO and not more than 1.5 percent other oxides.

DESCRIPTION OF THE PREFERRED EMBODIMENTS

Example 1.

A slip cast rod ⅝ inch in diameter and a drain cast 12 inches long tube 2 inches in diameter with a uniform wall thickness of about ¼ inch were formed of a mixture of two distinct materials. The first material made as described in the copending U.S. application Ser. No. 733,613, filed May 31, 1968, by Beall and Duke (which is assigned to the assignee of this application), now U.S. Pat. No. 3,600,204 had the following composition, on an oxide basis by weight: 71.8% $SiO_2$, 23.0% $Al_2O_3$, 5.0% $Li_2O$ and balance other oxides as impurities and residual fining agents. The second material, made as described in U.S. Pat. No. 3,157,522, had the following composition, on an oxide basis by weight: 69.7% $SiO_2$, 17.9% $Al_2O_3$, 4.8% $TiO_2$, 2.6% $Li_2O$, 2.8% MgO, 1.0% ZnO and balance other oxides as impurities and residual fining agents. Both materials were obtained in the form of −8+20 Tyler mesh glass cullets or frits. They were mixed together with water and ball-milled until at least 95 percent by weight of the particles in the slurry were −325 Tyler mesh. The amount of water in the slurry was sufficient to provide a flow rate of less than 5 seconds/100 ml. of slip through a ⅝ inch orifice. This aqueous slip was self-defloculating. The articles were formed by casting the slip into plaster of Paris molds having the requisite cavity sizes and shapes. The tube was formed by draining the remaining fluid slip out of the cavity after the proper wall thickness of slip had set-up or hardened in a tubular shape against the mold wall. After routine removal from the molds and drying of the green cast articles, they were fired or heat treated as follows (with temperature changes being at the usual furnace rate):

heated to 1050° C. and held there for one-half hour,
heated to 1180° C. and held there for one-half hour,
heated to 1270° C. and held there for two hours, and
thereafter cooled to room temperature.

These finished sintered articles exhibited positive coefficients of thermal expansion not greater than 0.2 × $10^{-7}$/°C. over the range of 5°–35°C. and 00.00 percentage apparent porosity.

Example 2.

A slip cast block 12 inches square and 3 inches thick was formed of the same mixture of cullet or frit materials as in Example 1. Part of such mixture was formed into a slip, cast into smaller shapes and fired as in Example 1, but then these fired shapes were crushed and ground to −14+100 Tyler mesh grog material. The batch solids for the larger block of this example consisted of 20 wt. percent the aforesaid grog material and 80 wt. percent of the at least 95 wt. percent −325 Tyler mesh mixture. The slip was formed by mixing the grog material into the slurry of ball-milled finer particles in water. The amount of water in the slip was sufficient to provide a flow rate of about 45 seconds/100 ml. of slip through a ⅝ inch orifice. After casting the slip into a plaster of Paris mold with the appropriate cavity, it was allowed to set up into a green block, then removed from the mold and dried. The dried green block was subjected to the same firing or heat treatment schedule described in Example 1. Test pieces of the finished block exhibited coefficients of thermal expansion in the range of −0.2 × $10^{-7}$/°C. over the range of 5°–35° C. Apparent porosity was less than 1 percent.

It will be appreciated that the articles of the foregoing examples could be made equally well by other common procedures such as by using an organic slip vehicle system instead of water, by isostatic or ram pressing a dry batch with or without a small amount of organic binder, or by the methods of U.S. Pat. Nos. 3,330,892 and 3,346,680.

We claim:

1. A ceramic article consisting essentially of a sintered consolidated particulate mixture consisting of 100 wt. percent −4 mesh particles, said article having a coefficient of thermal expansion of about 0±1 × $10^{-7}$/°C. over the temperature range of 5° to 35° C., having not more than 1% apparent porosity and predominantly composed of fine-grained inorganic crystals, said crystals being dispersed in a glassy matrix, said mixture consisting of:

a. 45 to 55 weight percent first particulate glass material composed of, on an oxide basis by weight, 70 to 74% $SiO_2$, 22 to 24% $Al_2O_3$, 4 to 6% $Li_2O$ and 0 to 2% other oxides, with the mole ratio $Al_2O_3$:$Li_2O$ being not more than 1.5, and b. 45 to 55 weight % second particulate glass material composed of, on an oxide basis by weight, 68 to 72% $SiO_2$, 17 to 19% $Al_2O_3$, 4 to 6% $TiO_2$, 2 to 4% $Li_2O$, the sum of $SiO_2$, $Al_2O_3$, $TiO_2$ and $Li_2O$ constituting at least 95% of the total second particulate material, 2 to 4% MgO, 0 to 2% ZnO and 0 to 2% other oxides, said mixture having been formed into a green article and said green article having been subjected to the following sequential heat treatment:

heated from room temperature to about 1020° to 1080° C.,
held at about 1020° to 1080° for at least 0.5 hour,
heated from about 1020° to 1080° C. up to about 1150° to 1210° C.,
held at about 1150° to 1210° C. for at least 0.5 hour,
heated from about 1150° to 1210° C. up to about 1250° to 1270° C.,
held at about 1250° to 1270° C. for at least 1 hour, and thereafter cooled to room temperature.

2. The article of claim 1 wherein said particulate mixture consists of 0 to 30 wt. percent −4+100 mesh particles and at least 90 wt. percent of the balance being −325 mesh particles.

3. The article of claim 1 characterized by a coefficient of thermal expansion of about 0 ± 0.2 × $10^{-7}$/°C. over the temperature range of 5° to 35° C. and wherein said mixture consists of about 50 wt. percent said first particulate glass material and 50 wt. percent said second particulate glass material.

4. The article of claim 3 wherein:

a. said first particulate glass material is composed of, on an oxide basis by weight, 71 to 73% $SiO_2$, 22 to 24% $Al_2O_3$, 4.5 to 5.5% $Li_2O$ and not more than 0.5 percent other oxides, with the mole ratio $Al_2O_3$:$Li_2O$ being not more than 1.5 and b. said second particulate glass material is composed of, on an oxide basis by weight, 69 to 71% $SiO_2$, 17 to 19% $Al_2O_3$, 4 to 5.5% $TiO_2$, 2 to 3% $Li_2O$, the sum of $SiO_2$, $Al_2O_3$, $TiO_2$ and $Li_2O$ constituting at least 95% of the total second particulate material, 2.3 to 3.3% $MgO$, 0.5 to 1.5% $ZnO$ and not more than 1.5 percent other oxides.

5. The article of claim 4 wherein said particulate mixture consists of 0 to 30 wt. percent −4+100 mesh particles and at least 95 wt. percent of the balance being −325 mesh particles.

6. The article of claim 1 wherein said green article has been formed by:

preparing a slip of said mixture and water, casting said slip into the cavity of a water absorbent mold, said cavity having the configuration and size desired for the green article, maintaining said cast slip in said mold until it develops a self-sustaining shape, and thereafter removing said green article from the mold and drying it.

* * * * *